(No Model.)
L. BRISTÖL.
SECONDARY BATTERY.
No. 493,817. Patented Mar. 21, 1893.
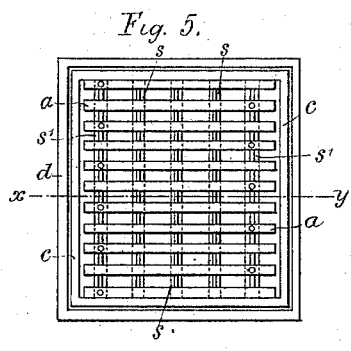
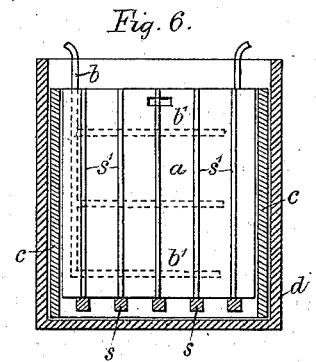
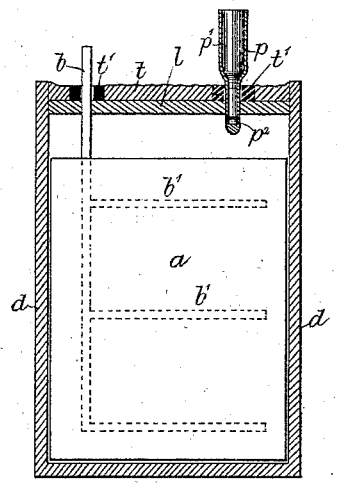
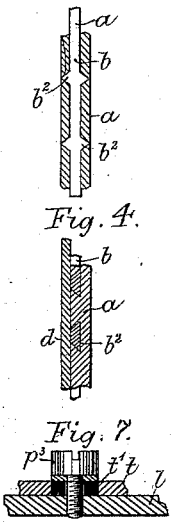
Witnesses:
Inventor:
Lars Bristöl.
per Richards
Attorneys.

UNITED STATES PATENT OFFICE.

LARS BRISTÖL, OF LONDON, ENGLAND.

SECONDARY BATTERY.

SPECIFICATION forming part of Letters Patent No. 493,817, dated March 21, 1893.

Application filed August 28, 1890. Renewed February 13, 1892. Serial No. 421,368. (No model.) Patented in Sweden April 10, 1888, No. 1,500; in Norway April 11, 1888, No. 942; in England July 6, 1888, No. 9,854, and in Belgium November 13, 1889, No. 88,445.

*To all whom it may concern:*

Be it known that I, LARS BRISTÖL, a subject of the King of Norway and Sweden, residing at Acacia Villa, Park End, Bromley, London, in the county of Kent, England, have invented new and useful Improvements in and connected with Secondary Batteries or Electrical Accumulators, (for which I have obtained Letters Patent in Norway, No. 942, bearing date April 11, 1888; in Sweden, No. 1,500, dated April 10, 1888; in Great Britain, No. 9,854, dated July 6, 1888, and in Belgium, No. 88,445, dated November 13, 1889,) of which the following is a specification.

My invention relates to the construction of secondary batteries or electrical accumulators, and has for its objects firstly, to prepare and constitute the said plates with such a degree of self-cohesiveness and rigidity that no additional metallic support is required, thus greatly increasing the storage capacity of the battery; secondly, to construct the battery with the said plates arranged in ultimate and permanent position for working; and thirdly to provide an efficient gas escape plug specially adapted to portable batteries.

I will now fully describe my invention in reference to the accompanying drawings in which similar letters refer to similar parts.

Figure 1 is a vertical section of a small two plate battery and Fig. 2 is a cross section thereof showing also my improved gas escape plug in section. Figs. 3 and 4 are vertical sections of plates showing method of fixing conductors. Fig. 5 is a plan of a multiple plate battery, and Fig. 6 is a section on line $x.\,y.$ thereof. Fig. 7 is an elevation of a plug hereinafter referred to.

To effect my first object I intimately mix and incorporate with the red lead or equivalent acting material employed to form the plates a suitable proportion of fibrous material to bind the material of the plates intimately together, this consisting of such material as hair, feathers, asbestus or the like. The proportions I prefer to employ may vary between one and three per cent. in weight.

I first mix the active material and the fibrous substance into a paste of suitable consistency. I then make the plates in molds and insert a conductor which may be of flattened lead wire or a platinum strip having preferably lateral branches to aid the flow and convey the current from the plate with the least possible resistance. I then subject the plates to a gentle pressure and allow them to dry. I may cover the plates with fine muslin or other fabric; this is however not required for permanent protection and may be removed at once or allowed to be decomposed by the action of the acid.

In the accompanying drawings $a$ represents the active material and $b$ the conductor with lateral branches $b'\,b'$ arranged extending for a suitable distance into the width of the plate $a$ as in Figs. 1, 2 and 6. In order to locate and maintain the conductor $b$ and its branches $b'$ in a central position in the active material I may employ transverse points or studs $b^2\,b^2$ Fig. 3 which rest on the mold during manufacture. For small batteries and for plates destined to lay next the casing of the cell in such a case for example as is illustrated in Fig. 2 I bevel off the edges of the conductor $b$ so as to form a dovetail in cross section. This form keys it efficiently into the material $a$ as in Fig. 4. These conductors must necessarily be of certain sizes to insure their efficiency as conductors but they are not used as supports for the plates.

I find that plates made as above set forth are sufficiently hard and rigid without the aid of any metallic support whatever.

To effect the second object I proceed as illustrated in Figs. 5 and 6. I arrange any number of plates $a$ in a bottomless case or box $c$ having strips $s$ across its base transversely to the plates and supporting same vertically, the end plates being against the case $c$ and the intermediate plates being kept at proper distances apart by distance strips $s'$ of wood or suitable material preferably saturated with paraffine or other suitable agent to resist the action of the electrolyte. Such strips $s'$ may advantageously be made about one sixteenth of an inch deep and five sixteenths of an inch apart. In constructing the battery I place the said bottomless case $c$ within another box or receptacle $d$ containing the usual active solution which is thus enabled to come thoroughly in contact with the plates and a lid $l$ is placed above and sealed. The plates are then formed and reduced by passing an electric current through them as usual.

In order to prevent the liquid splashing through the aperture in the sealed lid of the batteries and especially in portable batteries which may be shaken, in combination with the sealed lid $l$ Figs. 1 and 2 I use a special gas escape plug $p$ or tube of ebonite, glass or suitable material having a vertical hole $p'$ traversed transversely near its base below the lid by a horizontal hole $p^2$ and preferably terminating in a coned base as shown. I fill in the space above the lid $l$ with "Chatterton composition" pitch or any other suitable material $t$ and to avoid the cracking thereof around the terminals of the conductors $b$ caused by contraction and expansion or otherwise I provide a ring of rubber or other elastic substance $t'$ capable of withstanding the action of the electrolyte around same and I surround it with the composition.

When the battery is charged I may remove the gas escape plug $p$ and substitute a simple screw plug $p^3$ and washer of rubber or other elastic material not liable to injury by the acid as in Fig. 7. The battery is thus hermetically sealed and can be kept in any position without escape of the liquid.

What I claim as my invention, and desire to secure by Letters Patent, is—

1. In a secondary battery, plates composed of an active agent and a fibrous binding material, conductors embedded therein, said conductors having anchoring points or projections, substantially as described.

2. In a secondary battery, plates composed of an active agent and a fibrous binding material conductors embedded therein, said conductors being of dovetail shape in cross section, substantially as described.

3. In a secondary battery, a lid $l$, a gas escape plug $p$, extending through the lid, and having a transverse opening in its lower end to the interior of the plug, substantially as described.

In witness whereof I have hereunto set my hand in presence of two witnesses.

LARS BRISTÖL.

Witnesses:
JOSEPH CRAWHALL CHAPMAN,
 *F. I. P. A.*
HORACE J. BODDINGTON.